United States Patent
Lyons

(10) Patent No.: US 8,944,654 B1
(45) Date of Patent: Feb. 3, 2015

(54) WARNING LIGHT AND METHOD OF ASSEMBLY THEREOF

(75) Inventor: Jon H. Lyons, Haddam, CT (US)

(73) Assignee: Whelen Engineering Company, Inc., Chester, CT (US)

( * ) Notice: Subject to any disclaimer, the term of this patent is extended or adjusted under 35 U.S.C. 154(b) by 306 days.

(21) Appl. No.: 13/355,591

(22) Filed: Jan. 23, 2012

(51) Int. Cl.
*B60Q 1/26* (2006.01)
*F21V 31/00* (2006.01)
*F21V 25/00* (2006.01)

(52) U.S. Cl.
USPC ............. 362/542; 362/540; 362/11; 362/544; 362/546; 362/545

(58) Field of Classification Search
CPC .................................................... B60Q 1/2611
USPC ............ 313/542; 362/542, 11, 540, 544, 545, 362/546
See application file for complete search history.

(56) References Cited

U.S. PATENT DOCUMENTS

| | | | |
|---|---|---|---|
| 4,543,622 A | 9/1985 | Menke et al. | |
| 4,620,268 A * | 10/1986 | Ferenc | 362/517 |
| 5,091,828 A | 2/1992 | Jincks et al. | |
| 6,722,776 B1 | 4/2004 | Lyons et al. | |
| 6,805,470 B1 * | 10/2004 | Ward | 362/374 |
| 6,863,424 B2 | 3/2005 | Smith | |
| 7,854,531 B1 | 12/2010 | Lyons | |

* cited by examiner

*Primary Examiner* — Mariceli Santiago
*Assistant Examiner* — Jacob R Stern
(74) *Attorney, Agent, or Firm* — Alix, Yale & Ristas, LLP

(57) ABSTRACT

A warning light has a light transmissive dome, longitudinally extending base, plurality of clamps, and a plurality of warning light assemblies. The light transmissive dome has sidewalls which terminate in a bottom edge. Spaced apart attachment regions with a staging area, a locking area, and a first retaining lip are located along the bottom edge. The longitudinally extending base has sidewalls which terminate in a top edge. A second retaining lip extends downward from an exterior projection of the top edge. A plurality of clamps each have a face portion, and first and second engagement jaws which extend from the face portion. The first and second engagement jaws are configured to engage the first and second retaining lips. A fastener portion located on the face portion corresponds with a fastener. The fastener portion and fastener draw the first and second engagement jaws together.

8 Claims, 10 Drawing Sheets

WARNING LIGHT AND METHOD OF ASSEMBLY THEREOF

BACKGROUND

The present disclosure relates to warning light systems in the form of a light bar intended primarily for installation on land and marine vehicles, and particularly to a warning light enclosure and a method of assembly thereof.

Warning lights in the form of light bars mounted on emergency vehicles are well known in the art. Warning lights are utilized on many different types of vehicles to give visual indications of their presence during emergencies. Warning lights typically comprise an elongated base, a plurality of electronic components, and at least one lens portion. The elongated base is typically provided in the form of an extrusion. Prior art extruded bases take a multitude of different formations, and typically comprise aluminum, plastic, or a material having similar characteristics. A plurality of electronic components are traditionally mounted to the elongated base, and comprise warning lights, optical elements, a power supply, and corresponding circuitry. The lens portion is traditionally mounted to the base, enclosing the warning light assembly and protecting the sensitive electronic components from the elements. The lens may be provided with different colors and alternative light-refracting characteristics.

A wide variety of configurations for mounting the lens to the base, and enclosing the warning light's electronic components are known in the art. U.S. Pat. Nos. 6,722,776 and 7,854,531, assigned to the assignee of the present disclosure, are illustrative of warning light assemblies utilizing two different configurations to secure the lens portion, and enclose the electronic components. Traditionally, the lens portion is affixed to the longitudinally extending base via threaded connectors. The threaded connectors in prior art warning lights typically penetrate the lens to engage the base structure. Alternatively, the threaded connectors attach a top panel to the longitudinally extending base, and the lens portion slides into channels created along the periphery.

It should be noted that while prior art configurations provide simple methods of manufacture and assembly, the lens or dome of most prior art warning lights must be perforated during the manufacturing process to ensure secure assembly.

Water, dirt, and salt leaking into a warning light have adverse effects, including fogging the lenses, corroding metal parts, and destroying electronic components. Therefore, resistance to the elements is an important feature for warning lights intended for installation on land and marine emergency vehicles. As emergency vehicles are typically exposed to extremes of heat and cold, as well as water in the form of rain, sleet, snow, ice, and ocean spray, it is vital that warning lights perform adequately in a wide range of conditions.

SUMMARY

According to aspects of the disclosure, a warning light for attachment to a vehicle comprises a light transmissive dome, a longitudinally extending base, a plurality of clamps, and a plurality of warning light assemblies. The light transmissive dome has sidewalls terminating in a bottom edge. The bottom edge has a plurality of spaced apart attachment regions, which comprise a staging area, a locking area, and a first (upper) retaining lip. The first retaining lip is laterally spaced from an outside surface of the sidewall, and extends upward from the bottom edge of the dome. The staging area comprises a surface extending laterally from the outside surface of the sidewall. The staging area communicates with the locking area. The first retaining lip defines a locking channel between the first retaining lip and the outside surface of the sidewall.

The longitudinally extending base has sidewalls which terminate in a top edge. The top edge has an exterior projection laterally spaced from an outside surface of the sidewall. The exterior projection also has a second (lower) retaining lip which extends downward from the top edge of the base sidewalls.

A plurality of clamps secure the light transmissive dome to the longitudinally extending base. Each clamp has a face portion and first (upper) and second (lower) engagement jaws. The first and second engagement jaws project from the face portion, and are configured to engage the first and second retaining lips. A fastener portion is located on said face portion. A fastener corresponding to the fastener portion reversibly draws the first and second engagement jaws together.

In accordance with a further aspect of the disclosure, a method of assembling a warning light is contemplated in connection with the warning light assembly. Once the light transmissive dome and longitudinally extending base are provided as described, each of the plurality of clamps is secured to join the dome to the base. Each clamp is secured by engaging the second (lower) engagement jaw in the second retaining lip. Once the second engagement jaw is positioned in the second retaining lip, the clamp is angularly rotated about a point defined by the second engagement jaw, and the first (upper) engagement jaw is received in the staging area. After the first engagement jaw is received in the staging area, assembly further comprises longitudinally sliding each of the clamps toward the locking portion of the attachment region. As the clamps are slid into the locking portion, each first engagement jaw engages each first retaining lip. Once each of the clamps is fully received in the locking portion, each clamp is tightened. Tightening the fastener portion draws the first engagement jaw toward the second engagement jaw, which frictionally secures each of the clamps in the locking portion. Once each of the clamps is tightened, the light transmissive dome is secured against the longitudinally extending base, defining an interior cavity.

The apparatus and method of the present disclosure provide advantages over and relative to the prior art. For example, locating the attachment regions and clamps along the periphery of the light transmissive dome provide strong retention forces between the dome and base. Contrary to prior art methods where the forces retaining the lens against the base are provided intermediate the periphery of the warning light, it is more difficult for air pressure to separate the first retaining lip from the second retaining lip, and allow the elements to penetrate the warning light disclosed herein. Additionally, the method of assembling a warning light disclosed herein eliminates the need to perforate the warning light enclosure, thus avoiding additional points where the elements may enter the warning light enclosure.

BRIEF DESCRIPTION

The present disclosure may be better understood and its numerous objects and advantages will become apparent to those skilled in the art by reference to the accompanying drawings in which.

DETAILED DESCRIPTION

Figure 1:
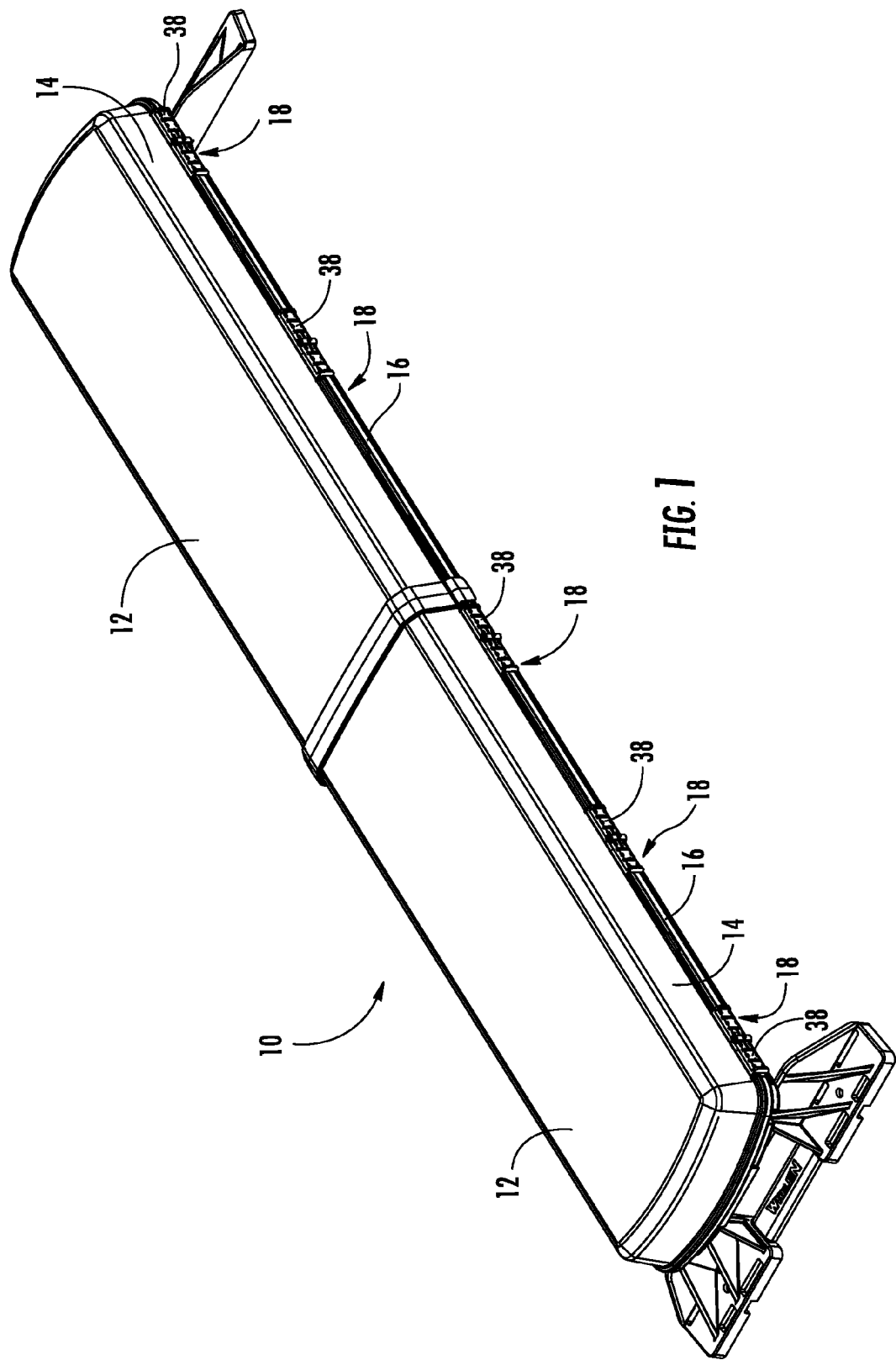
FIG. 1 is a perspective view of the exterior of one embodiment of a warning light where a pair of attachment feet are additionally provided to mount the warning light to a vehicle.

Exemplary warning lights illustrating various aspects of the present disclosure will now be described with reference to FIGS. 1 through 9, wherein like numbers refer to like parts. Throughout the figures, it will be understood by those of skill in the art that some features and components of the warning light are omitted for clarity.

The disclosed warning lights 10 take the form of a lightbar configured for mounting to the roof or upper portion of an emergency vehicle. The lightbar is mounted transverse to the path of travel of the vehicle and in a generally horizontal orientation. The disclosed warning lights include warning light modules and optics designed to generate a warning light signal that is visible 360° around the vehicle. The warning light signal is generally horizontal, with a limited vertical component. Directional references made throughout this specification are with respect to the disclosed embodiments and their intended installed orientation relative to the emergency vehicle. Generally speaking, the length of the lightbar extends horizontally and the dome is above the base. These directional references are not intended to limit the disclosed embodiments to any particular installed orientation and are merely used for clarity of relative position among disclosed structures.

The light transmissive dome 12 of the warning light 10 is molded from plastic such as polycarbonate. As depicted in FIGS. 3 and 4, in one embodiment the warning light may have an optical arrangement disposed on at least one interior surface of the dome. Sidewalls 14 of the dome 12 terminate in a bottom edge 16. As viewed from the exterior in FIGS. 1 and 2, in one embodiment of the current disclosure the bottom edge 16 spans the periphery of the sidewalls and one end of the dome 12. Attachment regions 18 are configured at a plurality of locations along the bottom edge 16. The attachment regions 18 are generally evenly spaced apart along the periphery of the bottom edge 16, though the attachment regions may be clustered in specific areas.

Figure 10:
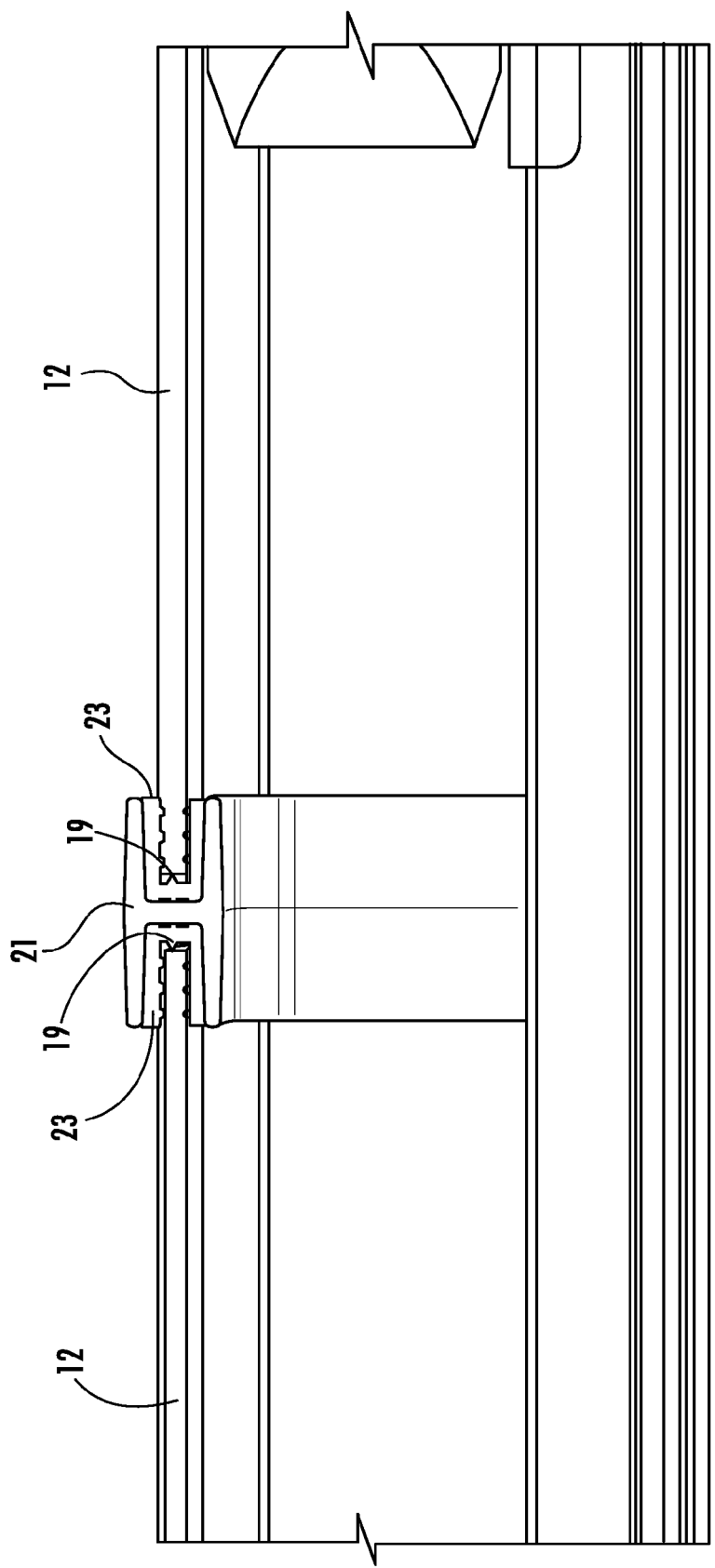
FIG. 10 is a cross-sectional view of one embodiment of the warning light with particular emphasis on the dome connector; the cross-sectional plane is oriented transverse the cross-sectional plane in FIGS. 4, and 5.

The dome 12 is manufactured to have an interior edge 19 to facilitate assembly. A dome connector 21 secures the interior edge 19 of the dome 12. As shown in FIG. 10, the I-beam construction of the dome connector 21 creates a water-tight connection with the interior edge 19 of the dome 12. Wipe seals 23 ensure a snug connection with the interior edge 19, and provide an added measure of protection against the elements.

Figure 7:
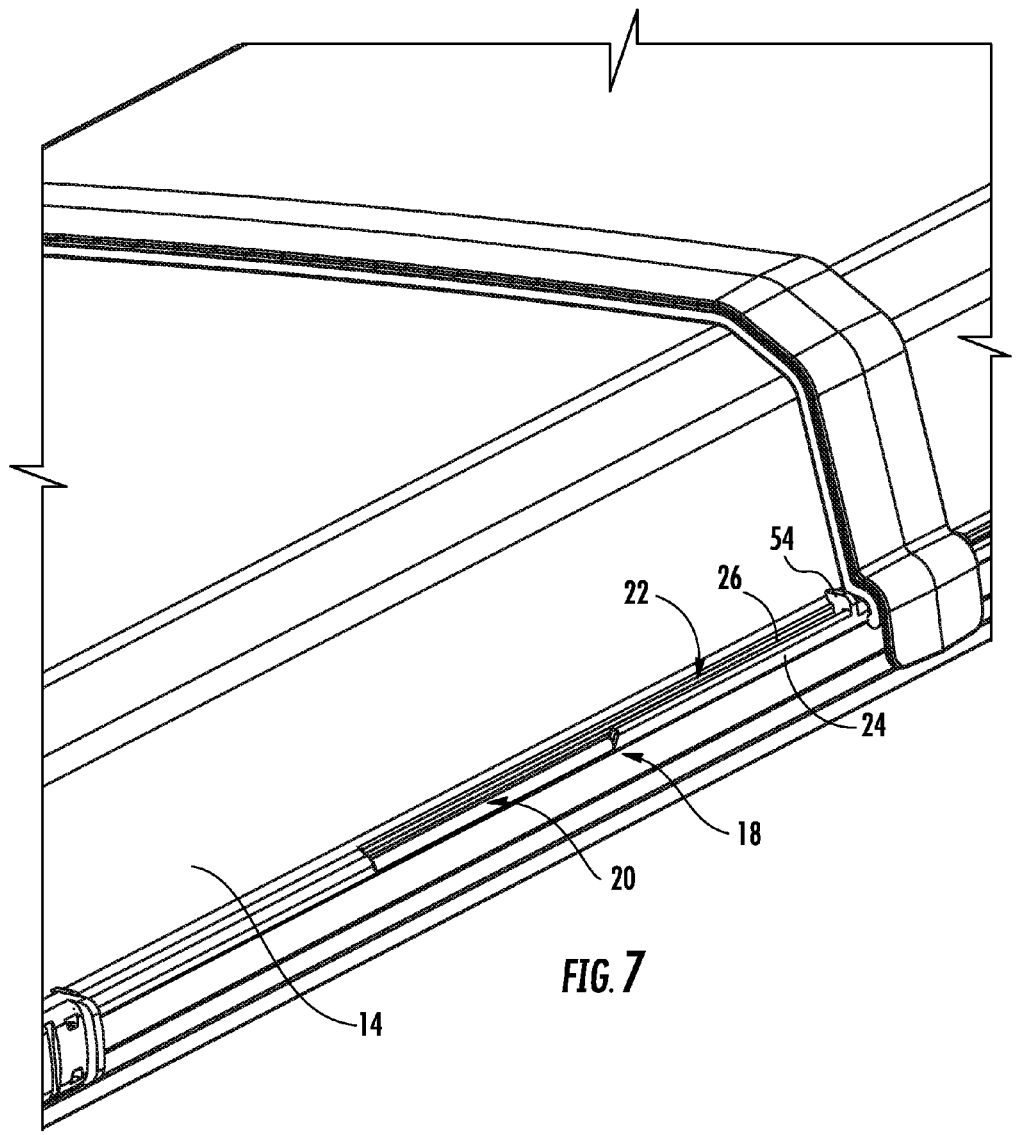
FIG. 7 is a perspective view of one of the plurality of attachment regions of the light transmissive base; the corresponding clamp has been removed to better illustrate aspects of the present disclosure.
Figure 8:
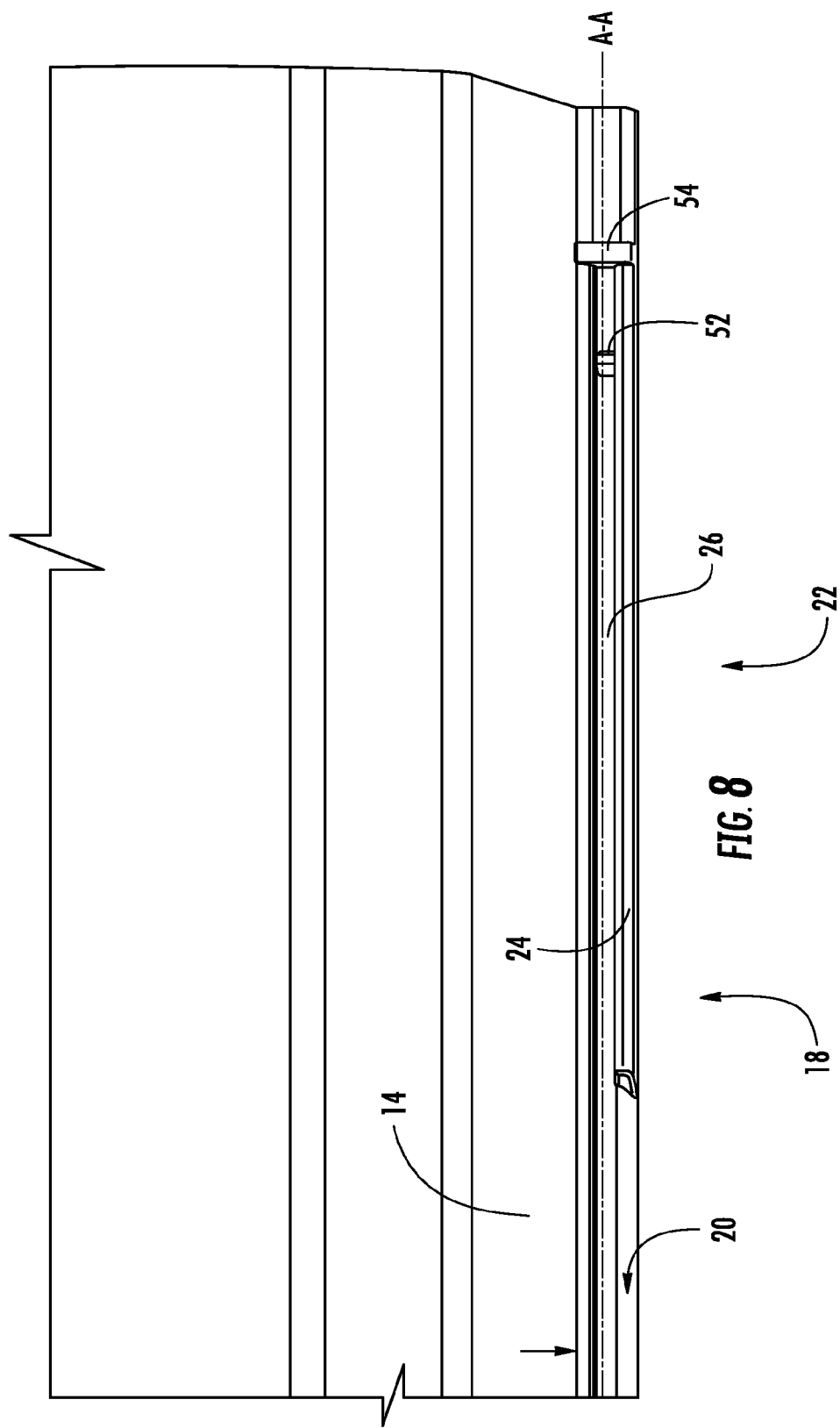
FIG. 8 is a close-up of one of the locking areas of the attachment regions as viewed from the top of the light transmissive dome; the corresponding clamp has been removed to better illustrate aspects of the present disclosure.

As shown in FIGS. 7 and 8, each of the attachment regions 18 is defined by two major portions: a staging area 20 and a locking area 22. The staging area 20 is generally configured as a surface extending laterally from an exterior surface of the sidewall at the bottom edge. The staging portion 20 is adjacent to, and communicates with the locking area 22 of the attachment regions 18. The locking portion 22 is notably defined by a first (upper) retaining lip 24 laterally spaced from the exterior surface of the sidewall 14. The first retaining lip 24 runs the length of the locking area 22, and projects upwardly to define a locking channel 26. The locking channel 26 is defined between the first retaining lip 24 and the exterior surface of the sidewall 14. Proceeding longitudinally along the upper retaining lip 24 toward the staging portion 20, the first retaining lip 24 has uniform height, which decreases at the point where the locking area 22 and the staging area 20 communicate.

Figure 2:
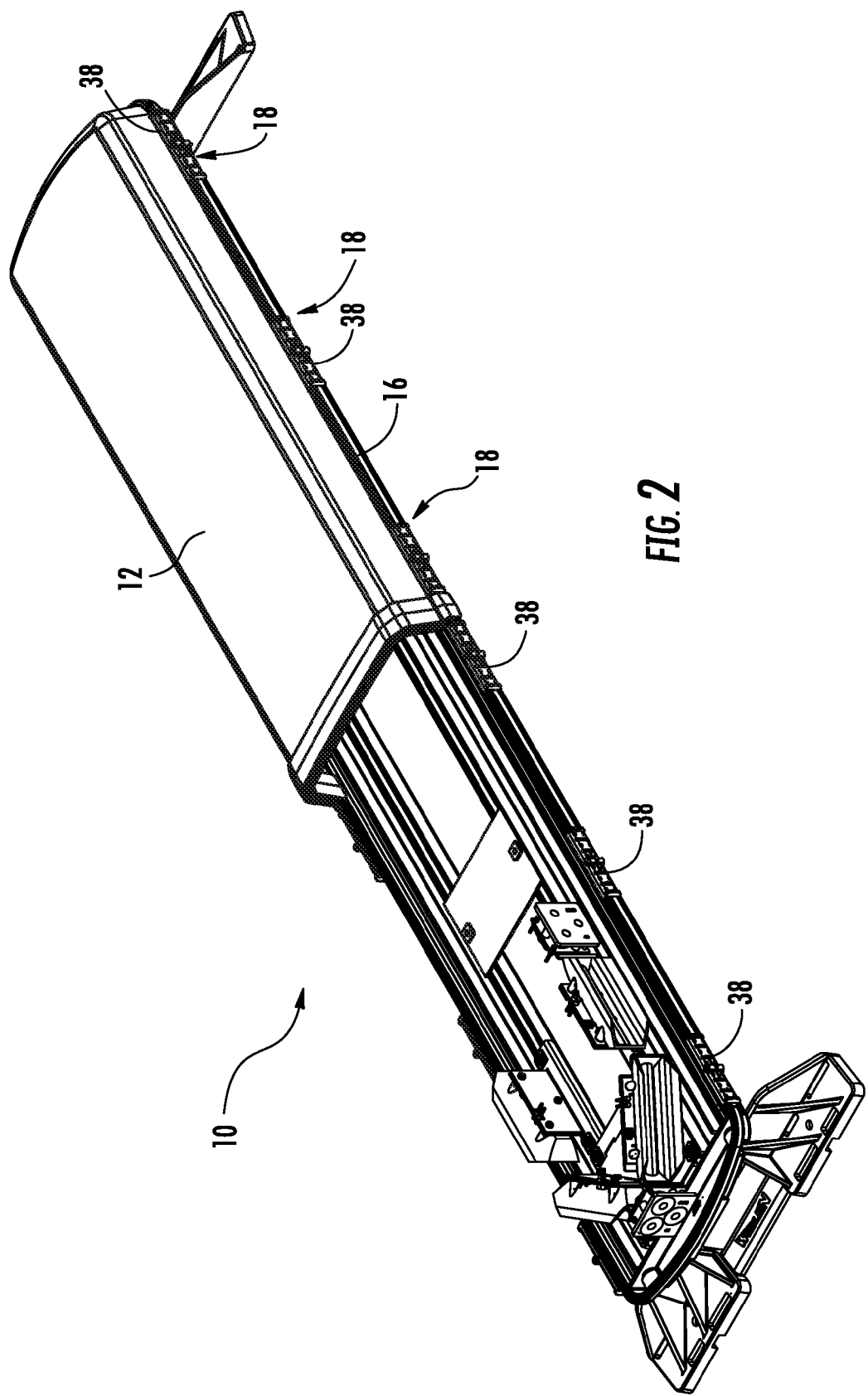
FIG. 2 is a perspective view of the embodiment of the warning light illustrated in FIG. 1; one half of the light transmissive dome is removed, exposing the plurality of warning light assemblies.
Figure 3:
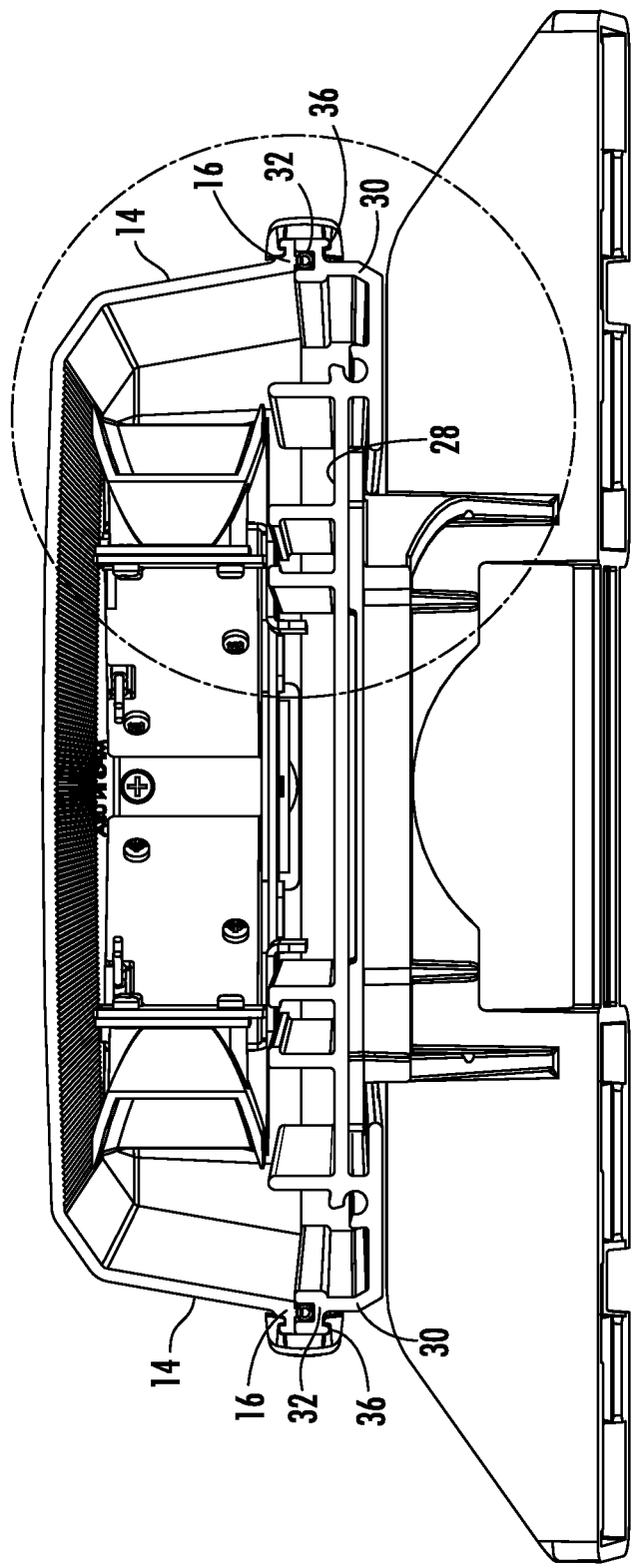
FIG. 3 is a cross-sectional view of one embodiment of the warning light in accordance with several aspects of the present disclosure.
Figure 4:
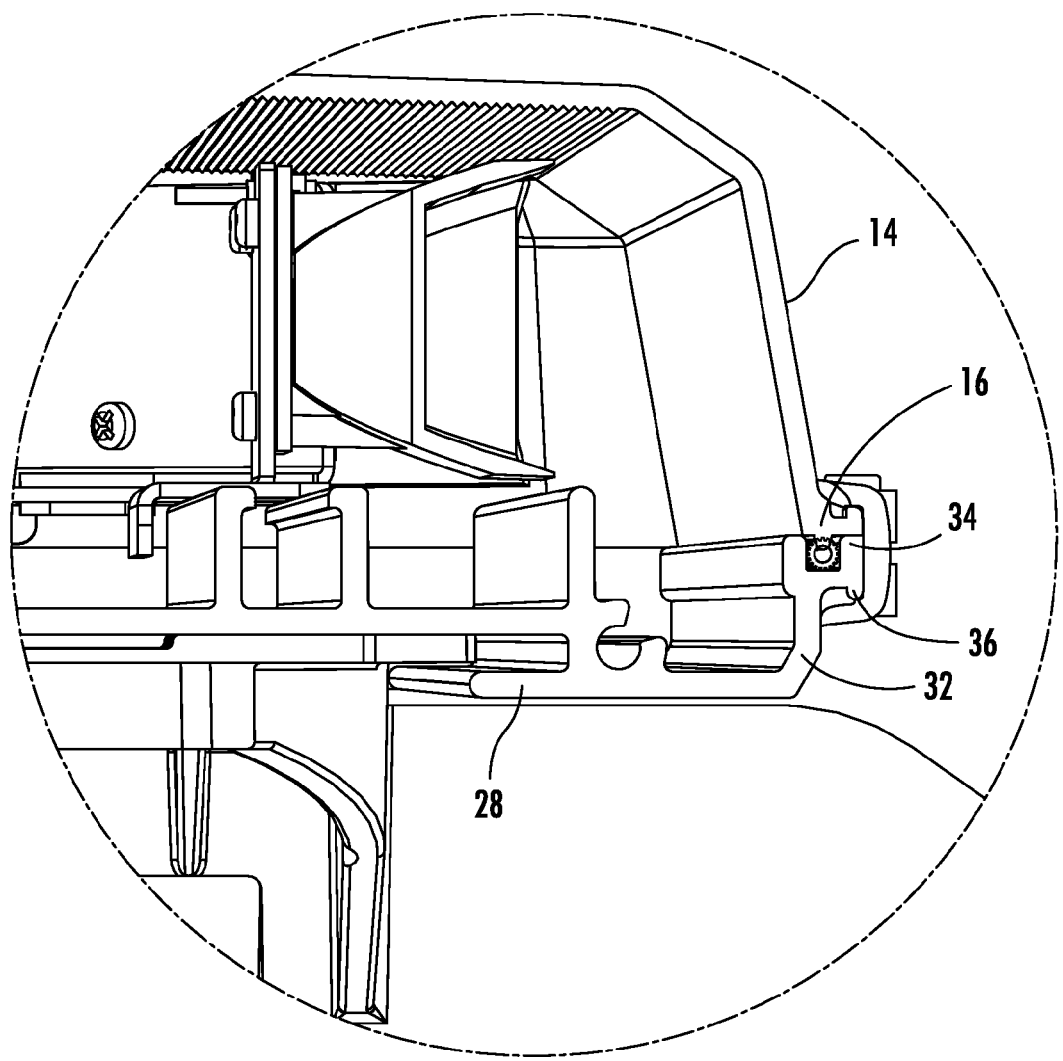
FIG. 4 is an enlarged cross sectional view illustrated in FIG. 3, with particular emphasis on the bottom edge and top edge of the light transmissive dome and longitudinally extending base.

As illustrated in FIGS. 2, 3, and 4, a longitudinally extending base 28 is also provided in connection with the warning light assembly disclosed herein. Sidewalls 30 extend upwardly from the base 28 and terminate at top edges 32, which extend the length of the base. Extending laterally outward from the exterior surface of the sidewall 30 of the base, an exterior projection 34 is located along the top edge 32. A second (lower) retaining lip 36 projects downward from the portion of the exterior projection 34 adjacent the top edge 32. The second retaining lip 36 forms a ridge running the length of the base 28.

Figure 5:
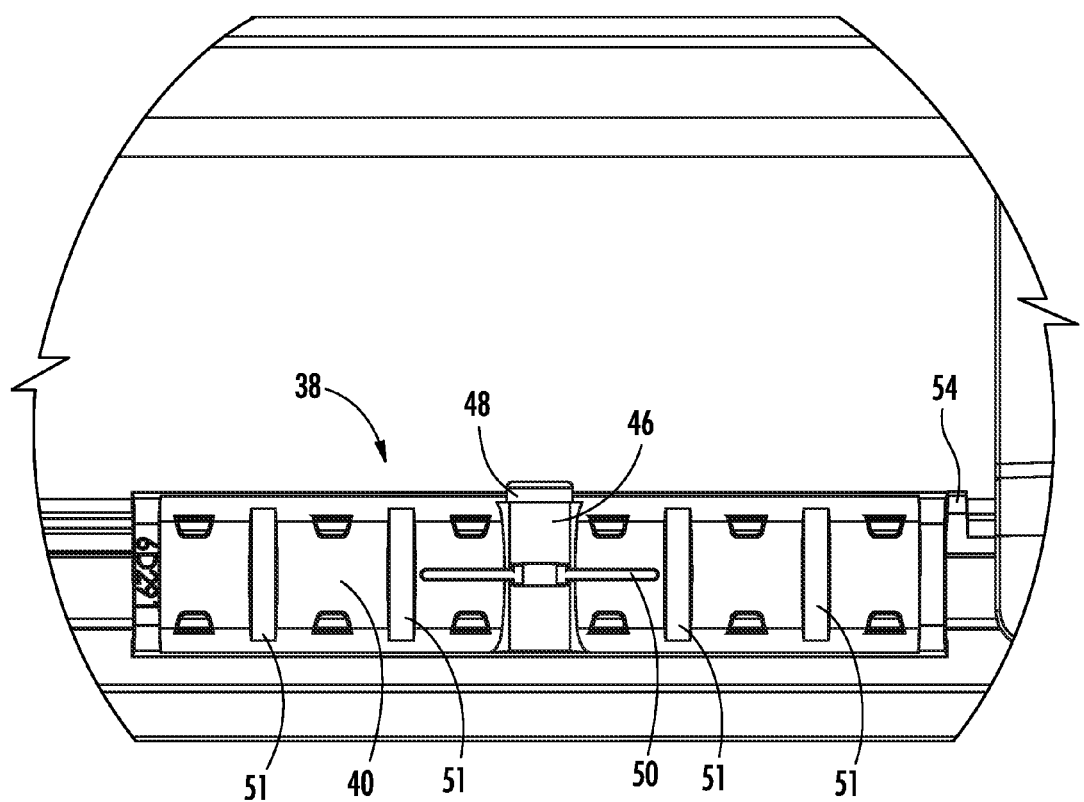
FIG. 5 is a close-up of one of the plurality of clamps as installed in the locking area of the light transmissive dome in accordance with aspects of the present disclosure.
Figure 6:
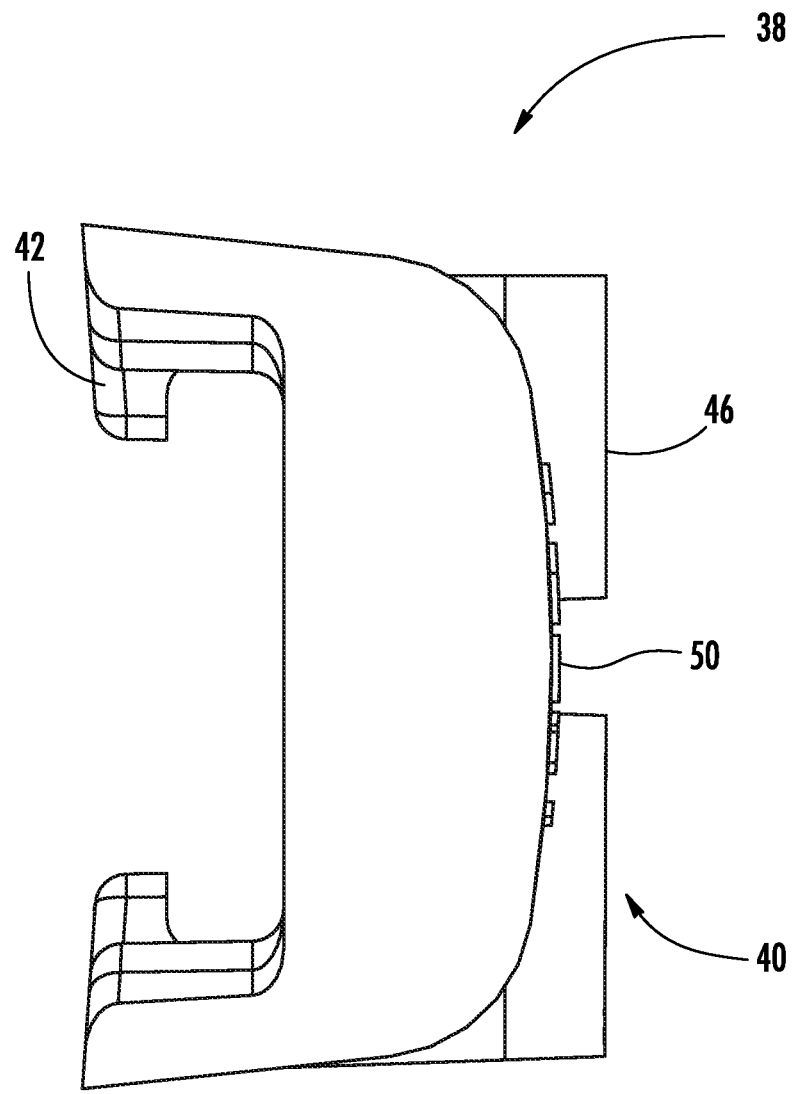
FIG. 6 is a side view of one of the plurality of clamps; the fastener and the other components of the warning light have been omitted for clarity.

A plurality of clamps 38 are provided, which corresponds to the plurality of attachment regions of the warning light 10. A face portion 40 comprises the main body of each clamp 38. The outward facing surface of an embodiment of the clamps is depicted in FIG. 5 in its installed position. As illustrated in FIG. 6, first (upper) and second (lower) engagement jaws (42 and 44 respectively) extend from the face portion 40 of each clamp 38. The first and second engagement jaws 42 and 44 are configured to releasably engage the first (upper) and second (lower) retaining lips 16 and 36 of the dome 12 and base 28.

As shown in FIGS. 5 and 6, a fastening portion 46 and a fastener 48 are also provided in conjunction with each clamp 38. The fastening portion 46 and fastener 48 ensure a secure connection between each of the plurality of clamps 38 and the attachment regions 18. The fastening portion 46 depicted in FIG. 5 consists of a generally cylindrically shaped receptacle located on the face portion 40 of each of the clamps 38. In one embodiment depicted in FIGS. 5 and 6, the fastening portion 46 is vertically oriented and has upper and lower segments separated by a slot 50 (described below). The fastener 48 is generally received in the fastening portion 46 of each clamp 38, and by manipulating the fastener, the upper engagement jaw 42 is drawn toward the lower engagement jaw 44. In the embodiment depicted in FIGS. 5 and 6, the fastening portion 46 and fastener 48 are corresponding portions of a threaded connection. As illustrated, the fastener 48 is the male portion of the threaded connection, while the fastening portion 46 is the female counterpart.

In the embodiment of the clamps depicted in FIGS. 5 and 6, the face portion 40 of each clamp also defines a slot 50 through the face portion. The slot 50 is located intermediate the first and second engagement jaws 42 and 44. This arrangement separates the fastening portion 46 of the clamp body into two portions, and allows the clamp 38 to be reversibly tightened by adjusting the fastener 48 accordingly. When the fastener 48 is tightened, the upper segment of the fastening portion is drawn towards the bottom portion. Consequently, the fastening slot 50 is compressed as the upper engagement jaw 42 is drawn towards the lower engagement jaw 44, and the clamp frictionally engages the upper and lower engagement lips.

In accordance with an additional embodiment of the current disclosure, the face portion 40 defines a plurality of grooves 51. The grooves 51 are shallow depressions, narrow in width and generally spanning the face portion 40 between the first and second engagement jaws 42 and 44. The grooves 51 are generally oriented transverse to the first and second engagement jaws 42 and 44. The grooves 51 allow for greater flexibility in a longitudinal direction, facilitating attachment of the clamps 38 to the warning light assembly 10.

Figure 9:
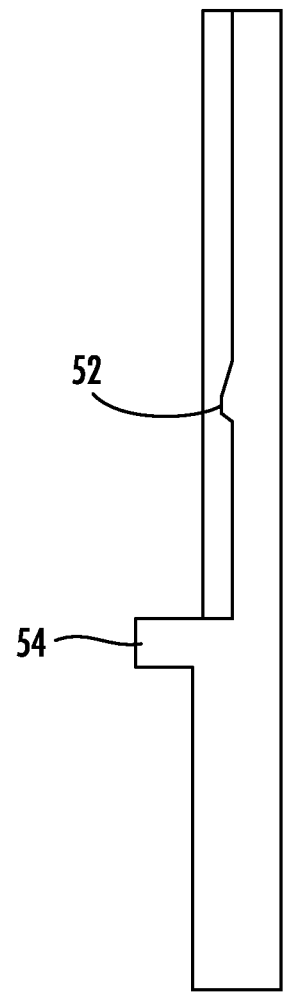
FIG. 9 is a cross-sectional view of the locking area illustrated in FIG. 7 as viewed from axis A-A.

As depicted in FIGS. 8 and 9, in one embodiment of the warning light 10, locking bumps 52 and stop members 54 are formed in the locking channel 26. The locking bump 52 is a raised nub of material that projects into the locking channel 26 at an end opposite the staging area 20. In the embodiments depicted in FIGS. 8 and 9, the locking bump 52 is depicted as a vertically raised nub disposed in the bottom of the locking channel 26.

A stop member 54 located adjacent the locking bump 52 defines the terminal end of the locking channel 26. As depicted in FIGS. 8 and 9, the stop member 54 is a raised wall that extends above the locking channel 26. As depicted in FIGS. 5 and 7, the stop member 54 also extends above the first retaining lip 24, and abuts the first engagement jaw 42 of the clamps 38 when the clamps are installed in the locking area.

Once the light transmissive dome 12 is correctly positioned atop the longitudinally extending base 28, each clamp 38 is installed by first engaging the lower engagement jaw 44 in the second retaining lip 36. The clamp is then angularly displaced (rotated) about a point defined by the second retaining lip 36, and the first engagement jaw 42 is received in the staging portion 20. When the upper and lower engagement jaws 42 and 44 are configured in the staging portion 20, the clamp is longitudinally displaced into the locking portion 22 of the attachment region 18. Once the clamp is situated in the locking portion 22 of the attachment regions 18, the upper and lower engagement jaws of each clamp engage the first and second retaining lips 24 and 36. The fastening portion 46 is next tightened, compressing the slot 50 and drawing the upper engagement jaw and lower engagement jaws 42 and 44 together. The upper and lower engagement jaws 42 and 44 frictionally secure the clamps 38 in the locking portion 22. The frictional closure ensures that the clamps 38 do not longitudinally slide off the locking portion 22, and ensure a tight seal between the dome 12 and the base 28.

In the alternate embodiment where the locking bump 52 and stop member 54 are provided, the locking bump 52 and stop member 54 provide further longitudinal retention forces. As the clamps are longitudinally displaced from the staging portion 20 to the locking portion 22, the first engagement jaw 42 of each clamp 38 rides over the locking bump 52. In this configuration, the locking bump 52 obstructs the first engagement jaw 42, preventing the clamp 38 from moving longitudinally toward the staging area 20. Thus locking bump 52 and stop member 54 provide retention forces before the fastener 48 is tightened, and before the upper and lower engagement jaws 42 and 44 frictionally engage the first and second retaining lips 24 and 36.

As depicted in FIGS. 3 and 4, once the warning light is assembled as described, the dome 12 and the base 28 define an interior cavity. A plurality of warning light assemblies 56 are installed in the interior cavity of the warning light assembly 10. The warning light assemblies 56 may be fixed to the longitudinal base 28 as depicted in FIGS. 3 and 4, or secured within the interior cavity by any method known in the art.

While a preferred embodiment has been set forth for purposes of illustration, the foregoing description should not be deemed a limitation of the invention herein. Accordingly, various modifications, adaptations and alternatives may occur to one skilled in the art without departing from the spirit of the invention and scope of the claimed coverage.

What is claimed is:

1. A warning light for attachment to a vehicle comprising:
a light transmissive dome having sidewalls terminating in a bottom edge, the bottom edge having a plurality of spaced apart attachment regions, the attachment regions having a staging area, a longitudinally aligned locking area, and a first retaining lip laterally spaced from an outside surface of the sidewall and extending upward from the bottom edge, the staging area comprising an interruption of said first retaining lip and a staging surface extending laterally from the outside surface of the sidewall and communicating with the locking area, portions of said first retaining lip defining a locking channel between the first retaining lip and the outside surface of the sidewall;
a longitudinally extending base having sidewalls terminating in a top edge, the top edge having an exterior projection laterally spaced from an outside surface of the sidewall, and the exterior projection including a second retaining lip extending downward from the top edge;
a plurality of clamps, each clamp having a face portion, first and second engagement jaws projecting from the face portion, the first jaw being receivable in a staging area in a first longitudinal position, the first and second jaws configured to engage the first retaining lip of the dome and the second retaining lip of the base in the locking area at a second longitudinal position, a fastener portion located on said face portion and a fastener for reversibly drawing the first and second engagement jaws together, whereby when the fastener is tightened the clamps frictionally engage the first and second retaining lips preventing longitudinal movement of each clamp from the locking area thereby securing said dome to said base to form a warning light assembly which defines an interior cavity;
a plurality of light generating assemblies installed in the interior cavity of the warning light.

2. The warning light of claim 1, wherein the face portion of each of the plurality of clamps also defines a slot through the face portion located on the fastener portion, said slot intermediate the first and second engagement jaws, oriented parallel to said engagement jaws, and bisecting the fastening portion into first and second fastening segments, and whereby tightening the fastener compresses the first and second fastening segments drawing the first and second engagement jaws together.

3. The warning light of claim 1, wherein the face portion of each of the plurality of clamps also defines a plurality of grooves generally spanning the face portion coterminous with the first and second engagement jaws, and oriented generally transverse the first and second engagement jaws.

4. The warning light of claim 1, the channel of the locking portion further having a locking bump located at an end of the channel opposite the staging area and projecting into the channel, whereby said first engagement jaw rides over said locking bump upon sliding said clamp into said locking area, whereupon said locking bump maintains said clamp in the locking channel.

5. The warning light of claim 3, each locking portion having a stop member, the stop member located in the terminus of the channel of the locking portion and preventing the clamps from sliding longitudinally past the locking portion.

6. The method of claim 5, wherein the step of providing a plurality of clamps also comprises providing a generally horizontal fastening slot in the face portion of each clamp and wherein tightening the fastener compresses the horizontal fastening slot facilitating bringing the first engagement jaw towards the second engagement jaw.

7. A method of assembling a warning light comprising the steps of:
provoking a light transmissive dome having a plurality of attachment regions, the attachment regions having a planar staging area, a locking area, and a first retaining lip laterally spaced from an outside surface of the sidewall extending upward from the bottom edge and running the length of the locking area and defining a locking channel;
providing a longitudinally extending base having sidewalls terminating in a top edge, the top edge having an exterior projection laterally spaced from an outside surface of the sidewall, and the exterior projection defining a second retaining lip extending downward from the top edge;
providing a plurality of clamps having a face portion, first and second engagement jaws extending from the face portion, the first and second engagement jaws configured to engage the first and second retaining lips, a fastener portion and fastener located on the face portion;
engaging the second engagement jaw of each of the clamps in the second retaining lip and angularly rotating the clamps about a point defined by the second engagement jaw so that the first engagement jaw is received in the planar staging area of the attachment region;
longitudinally sliding each of the clamps from the staging portion toward the locking portion thereby engaging each first engagement jaw with each of the first retaining lips;
tightening the fastener of each of the clamps, bringing the first engagement jaw toward the second engagement jaw and frictionally securing each of the clamps in the locking portion of each of the attachment regions and securing the light transmissive dome against the longitudinally extending base.

8. The method of claim 7, wherein the step of providing a light transmissive dome also comprises providing a locking bump located at an end of the channel opposite the staging area and projecting into the channel, and longitudinally sliding each of the clamps from the staging portion toward the locking portion comprises riding said first engagement jaw against said locking bump and sliding said clamp into said locking area, said locking bump maintaining said clamp in said locking channel.

\* \* \* \* \*